United States Patent [19]
Eichhorn et al.

[11] Patent Number: 5,971,258
[45] Date of Patent: *Oct. 26, 1999

[54] METHOD OF JOINING ALUMINUM PARTS BY BRAZING USING ALUMINUM-MAGNESIUM-LITHIUM-FILLER ALLOY

[75] Inventors: Edgar G. Eichhorn; David L. Childree, both of Livermore, Calif.

[73] Assignee: Kaiser Aluminum & Chemical Corporation, Pleasanton, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/552,386

[22] Filed: Nov. 3, 1995

Related U.S. Application Data

[63] Continuation-in-part of application No. 08/365,789, Dec. 29, 1994, Pat. No. 5,535,939, and application No. 08/365,741, Dec. 29, 1994, Pat. No. 5,520,321, each is a division of application No.08/195,067, Feb. 14, 1994, Pat. No. 5,422,191.

[51] Int. Cl.$^6$ .......................... B23K 31/02; B23K 103/10
[52] U.S. Cl. ................. 228/262.51; 228/183; 148/528; 165/905
[58] Field of Search .................... 228/183, 208, 228/220, 223, 262.51; 148/528; 165/905

[56] References Cited

U.S. PATENT DOCUMENTS

| | | | |
|---|---|---|---|
| 3,272,624 | 9/1966 | Quaas | 75/138 |
| 3,604,104 | 9/1971 | Glasgow | 228/262.51 |
| 3,859,145 | 1/1975 | McGlasson et al. | 428/654 |
| 3,891,400 | 6/1975 | Robinson | 428/654 |
| 4,172,181 | 10/1979 | Kawase et al. | 428/654 |
| 4,173,302 | 11/1979 | Schultze et al. | 228/219 |
| 4,721,653 | 1/1988 | Oda et al. | 428/654 |
| 4,861,391 | 8/1989 | Rioja et al. | 148/564 |
| 5,069,980 | 12/1991 | Namba et al. | 428/654 |
| 5,332,455 | 7/1994 | Chang et al. | 148/440 |
| 5,422,191 | 6/1995 | Childree | 428/654 |

FOREIGN PATENT DOCUMENTS

| | | | |
|---|---|---|---|
| 59-100249 | 6/1984 | Japan | 428/654 |
| 3-19291 | 3/1991 | Japan . | |
| 832791 | 4/1960 | United Kingdom | 428/654 |

*Primary Examiner*—Samuel M. Heinrich
*Attorney, Agent, or Firm*—Jones, Tullar & Cooper

[57] ABSTRACT

The present invention provides a method of joining aluminum parts by brazing, comprising the steps of (a) providing a composite sheet having an aluminum core alloy material and a filler alloy cladding, applied to the core alloy material, the cladding including about filler alloy for brazing, which includes about 4 to 18 wt. % silicon, about 0.001 to 0.4 wt. % magnesium, about 0.01 to 0.3 wt. % lithium, not more than about 2 wt. % zinc, not more than about 1.25 wt. % manganese, not more than about 0.30 wt. % iron, not more than about 0.10 wt. % copper, not more than about 0.15 wt. % impurities, balance aluminum; (b) contacting an aluminum part with the filler alloy cladding; and (c) brazing the aluminum part and the composite sheet to produce a brazed assembly.

19 Claims, 6 Drawing Sheets

Figure 4. Effect of Various Alloying Elements on the Fillet Formation Test Sample Fillet Length.

Figure 1a. Effect of Lithium Level on the Joint Size of Vacuum Brazed Vertical Fin Pack Samples.

Figure 1b. Effect of Magnesium Level on the Joint Size of Vacuum Brazed Vertical Fin Pack Samples.

Figure 2a. Effect of Lithium Content on the Size of Fluoridic Flux Brazed Mini-radiator Joints.

Figure 2b. Effect of Magnesium Content on the Size of Fluoridic Flux Brazed Mini-radiator Joints.

Figure 3. Effect of Lithium Level on Vacuum Brazed Horizontal Wedge Tee Joint Size at Constant Magnesium Level of 0.2% by Weight.

Figure 4. Effect of Various Alloying Elements on the Fillet Formation Test Sample Fillet Length.

METHOD OF JOINING ALUMINUM PARTS BY BRAZING USING ALUMINUM-MAGNESIUM-LITHIUM-FILLER ALLOY

This application is a continuation-in-part of U.S. Ser. No. 08/365,789, filed Dec. 29, 1994, now U.S. Pat. No. 5,535,939 and a continuation-in-part of U.S. Ser. No. 08/365,741, filed Dec. 29, 1994, now U.S. Pat. No. 5,520,321 both of which are divisional applications of U.S. Ser. No. 08/195,067, filed Feb. 14, 1994, now U.S. Pat. No. 5,422,191, issued Jun. 6, 1995.

BACKGROUND OF THE INVENTION

Joining of aluminum by brazing is a well known process due to the strong and uniform joints that can be produced between aluminum parts of varying shapes and types. There are four major brazing processes utilized for the joining of aluminum parts, these are: (a) the flux dip brazing process wherein the parts to be joined are dipped into a molten flux bath utilizing a mixture of chloride and fluoride salts; (b) the furnace brazing process which employs a small amount of flux, for example a chloride salt; (c) the controlled atmosphere brazing process which uses a small amount of fluoridic salt and an inert gas atmosphere, for example nitrogen, argon or helium; and (d) the vacuum brazing method which uses no flux but instead utilizes a reduced pressure atmosphere for the joining of the aluminum parts.

Each of these brazing methods has advantages and disadvantages. For example, the flux dip brazing process is associated with environmental problems arising out of the disposal of the used flux baths. Also, the aluminum parts joined by the flux dip brazing process must be thoroughly cleaned after fluxing to avoid the corrosive effects of the residual flux on the aluminum surfaces.

In the furnace brazing process, much less flux is utilized and the flux is directly deposited on the surfaces of the parts to be joined. Thus, there is no flux bath disposal problem. Nevertheless, the furnace brazing process cannot be readily utilized for the brazing of those aluminum alloys which have a relatively high magnesium content. Typical examples of those alloys which are not readily brazeable by the furnace brazing method are those aluminum alloys which belong to the Aluminum Association 5XXX series.

The controlled atmosphere brazing process employs an inert gas atmosphere, for example argon or nitrogen gas atmosphere, in the brazing furnace. The inert gas atmosphere brazing employs a relatively small quantity of non-corrosive flux which need not be cleaned from the brazed surfaces. The fluoridic flux is expensive and in composite brazing sheets undesirable interactions between the fluoride flux and magnesium limit the maximum core alloy magnesium content to about 0.3%.

In vacuum brazing no flux is employed and the method is suitable for joining those aluminum alloys which contain about 0.1–1.75% by weight magnesium or even more. Due to the magnesium content of the aluminum alloy core, the brazed assembly is capable of exhibiting higher strength properties. Vacuum brazing requires a well sealed furnace, careful control of the pressure within the furnace, both of which may impart higher costs to the brazing process. Additionally, in the vacuum brazing process, assembly tolerances must be critically controlled and the cleanliness of the parts is imperative.

For many applications, especially where strength was a major consideration, the use of aluminum alloys containing magnesium (Mg) up to about 2.00% was desired. Joining of such magnesium-containing alloys by brazing could only be accomplished through use of the vacuum brazing process. Vacuum brazing, however, requires the installation of an expensive vacuum brazing furnace and thus, the process becomes capital intensive.

Those aluminum alloys which are essentially Mg-free cannot be brazed by the vacuum brazing process. Currently, for joining these Mg-free aluminum parts the controlled atmosphere brazing method, employing for example nitrogen atmosphere, is used in the presence of a fluoridic flux. Where brazing of both Mg-free and Mg-containing aluminum alloys was practiced, it was necessary to segregate the different types of alloys and additionally, two different types of furnaces had to be installed, one for controlled atmosphere brazing and the other for vacuum brazing.

Thus, there has been a longstanding need for a filler alloy which could be utilized for the brazing of either magnesium-free or magnesium-containing aluminum alloy parts by controlled atmosphere brazing or by vacuum brazing. Surprisingly, it has been found that an aluminum filler alloy, containing a controlled quantity of magnesium and lithium can be readily employed for the brazing of Mg-free and Mg-containing aluminum alloys using either the controlled atmosphere (inert gas) brazing method or the vacuum brazing process. The aluminum filler alloy of the invention contains from about 0.001% to about 0.4% by weight of magnesium and from about 0.01 to about 0.30% by weight of lithium and as a major alloying element silicon, generally within the limits from about 4 to about 18% by weight of the brazing alloy. The alloy optimally can contain up to ~1.25% Mn.

It has been recommended in U.S. Pat. No. 3,272,624 (Quaas) to incorporate 0.005–0.010% lithium into aluminum in order to obtain a self-fluxing filler alloy for welding aluminum parts together. The alloy is employed as an extruded or cast wire and is melted during the joining process to obtain a self-fluxing, deoxidizing deposit in the joint area. If desired, up to 18.0% silicon can also be incorporated in the filler alloy. This alloy is employed as a substitute for fluxes containing chloride and fluoride salts since its residue does not need to be removed from the produced joint. Recommended areas of application include carbon arc, oxy-acetylene and inert arc welding. There is no recognition that the presence of the lithium in the aluminum alloy would render it suitable for use as a filler alloy for the brazing of Mg-containing aluminum parts in the presence of fluxes or as a filler alloy in the fluxless vacuum brazing of aluminum components.

U.S. Pat. No. 4,173,302 (Schultze et al) recommends the use of an aluminum brazing alloy which contains 4–20% silicon and between 0.00001 and 1.0% by weight, preferably between 0.005 and 0.1 by weight at least one of the elements of sodium, potassium and lithium. According to this reference the alloy can be utilized in the fluxless brazing of aluminum-containing articles in a non-oxidizing atmosphere or in a low vacuum. The addition of these alkali metals to the brazing alloy is claimed to increase the corrosion-resistance of the brazed joint. The use of these alkali metal-containing brazing alloys is restricted to fluxless, controlled atmosphere brazing and the beneficial effects of these alkali metals are considered equivalent.

U.S. Pat. No. 5,069,980 (Namba et al) describes a clad aluminum alloy suitable for fluxless vacuum brazing. The cladding material is to be used on both sides of a core sheet. It contains 6–14% silicon, 0.06% magnesium, balance aluminum and additionally, at least one of the following elements may also be incorporated in the cladding alloy for the improvement of its corrosion-resistance: Pb, Sn, Ni, Cu, Zn, Be, Li and Ge. The role of these additives in the alloy are equated as far as their corrosion-resistance improving effect is concerned.

It has surprisingly been discovered that the presence of lithium in combination with magnesium in the filler alloy, when added in controlled amounts within the range from about 0.01 to about 0.3% by weight lithium and 0.05 to 0.4% by weight magnesium, allows the use of the filler alloy for brazing either by the controlled atmosphere brazing method or by the vacuum brazing process, as well as other conventional brazing processes.

The universal applicability of the filler alloy of the invention for the brazing of both magnesium-containing and magnesium-free aluminum alloys eliminates the need to segregate these alloys and further provides the freedom to use a wide range of conventional brazing processes desired by the manufacturer of brazed aluminum assemblies.

SUMMARY OF THE INVENTION

The present invention provides a filler alloy for brazing, which includes about 4 to 18 wt. % silicon; about 0.001 to 0.4 wt. % magnesium; about 0.01 to 0.3 wt. % lithium; not more than about 2 wt. % zinc; not more than about 1.25 wt. % manganese; not more than about 0.30 wt. % iron; not more than about 0.10 wt. % copper; not more than 0.15 wt. % impurities; balance aluminum. Alternatively, the invention provides a brazing sheet composite wherein the filler alloy cladding is applied to an aluminum core alloy material.

In an alternative embodiment, the invention provides a process of joining aluminum parts by brazing to produce an assembly. The process comprises providing the brazing sheet composite, contacting an aluminum part with the filler alloy cladding; and brazing the aluminum part and the composite sheet to produce a brazed assembly.

The foregoing and other objects, features, and advantages of the invention will become more readily apparent from the following detailed description of preferred embodiment which proceeds with reference to the drawings.

DETAILED DESCRIPTION OF THE INVENTION

This invention relates to the brazing of aluminum articles. More particularly, this invention relates to a novel Mg and Li-containing aluminum filler alloy suitable for the brazing of both Mg-free and Mg-containing aluminum alloy articles by either the controlled atmosphere brazing process or by the vacuum brazing method.

For the purposes of this invention, and as used hereinafter, the terms "controlled atmosphere brazing" or "CAB" refer to a brazing process which utilizes an inert atmosphere, for example nitrogen, argon or helium in the brazing of aluminum alloy articles.

The term "vacuum brazing" as used herein refers to a process which employs reduced pressure in the brazing of aluminum alloy articles.

The filler alloy of the present invention, whether or not its use is in the controlled atmosphere brazing process or in the vacuum brazing process, contains from about 0.01 to about 0.3% lithium. In addition to the lithium content, the filler alloy also contains from about 0.001% to about 0.4% magnesium and from about 4 to about 18% Si. The filler alloy may also contain additional constituents, for example, zinc up to about 2%, manganese up to about 1.25%, iron in amounts up to about 0.30% and copper up to about 0.10%. The aluminum filler alloy generally also contains the usual unavoidable impurities up to a total amount of about 0.15%. Most preferably, the filler alloy of the present invention comprises from about 0.01 to 0.3 wt. % lithium and from about 0.001 to 0.4 wt. % magnesium.

In the event the filler alloy is employed in the CAB process, for example in combination with the well-known fluoridic flux, the lithium content of the filler alloy is preferably maintained within the range from about 0.01 to about 0.3% and the magnesium content is preferably maintained within the range from about 0.001% to about 0.4%. Variations of the flux can be employed. For example, the flux can contain LiF to further improve the brazeability. This alloy can be used with any controlled atmosphere brazing process in which any flux or pretreatment is employed.

The novel filler alloy is generally employed in the form of a brazing sheet rolled from ingots having the desired alloy composition. Regardless of which brazing process the brazing sheet is going to be used in, for best results it is applied to the surface of the aluminum core alloy through cladding. Cladding of the aluminum core alloy with the brazing sheet is accomplished by methods well-known in the art, for example by pressure welding through a rolling process. Depending on the assembly to be made the brazing or filler alloy sheet may be applied to one or both sides of the aluminum core alloy. The thickness of the brazing sheet applied to one or both surfaces of the core alloy is usually within the range from about 5 to about 20% of the thickness of the aluminum composite. Thus, for example, if the thickness of the aluminum composite is about 0.1 inch (2.54 mm), then the thickness of the cladding applied to the surface of the aluminum core can vary between 0.005 and 0.020 inch (0.127–0.508 mm).

The types of aluminum core alloys, which are clad with the novel filler or brazing alloy sheet, are generally selected on the basis of the end use of the brazed assembly. Suitable aluminum core alloys which can be clad with the novel filler alloy composition include those aluminum alloys which are classified as 1XXX, 3XXX, 5XXX and 6XXX aluminum alloys by the Aluminum Association, the 3XXX alloys being preferred.

The clad aluminum composite may be subjected to a heat treatment to improve its physical properties. Thus, the clad composites of the present invention may be subjected to a heat treatment equivalent, for example, to H-temper.

The clad aluminum alloy compositions of the present invention can be readily employed for making brazed heat exchanger assemblies, such as radiators and components for such heat exchangers. Other applications are also possible, for example, utilization of the aluminum alloy brazing composition in the manufacture of evaporators.

The brazing of the assemblies made from the aluminum core alloys clad with the Mg and Li-containing brazing sheet is accomplished according to principles well-known in the brazing art. For example, in the CAB process, flux can be applied to the aluminum parts to be joined, then the assembly is preheated, for example to a temperature in the range from about 425°–475° F. (224°–246° C.). The assembly is then transferred to a prebraze chamber where it is soaked for about 3–15 minutes at about 750° F. (399° C.). Subsequently, the hot assembly is transferred to the brazing furnace which is purged with dry nitrogen. The assembly is kept then for 2–3 minutes at about 1095° F.–1130° F. (591° C.–610° C.) in the CAB furnace. The brazed assembly is then cooled, removed, and applied for its intended use.

If the vacuum brazing process is utilized for the joining of aluminum parts, no flux is applied to the joint area. The assembly to be brazed is usually preheated to about 425°–700° F. (224°–371° C.) and then introduced into the vacuum furnace. In the vacuum furnace, the preheated assembly is heated in stages to about 1095°–1120° F. (591°–604° C.) and then kept at temperature for about 3 minutes. Subsequently, the brazed assembly is cooled to about 1050°–1070° (566°–577° C.) and then removed from the vacuum furnace to be used for its intended purpose.

In the case of Mg-containing and also Mg-free aluminum core alloys, regardless of the brazing methods applied, the strengths of joints formed as measured by the area, weight or length of the filler in the joints of the assemblies, are substantially the same. This fact indicates that the novel filler alloy can be readily employed for the production of vacuum or CAB brazed assemblies made from both Mg-free and Mg-containing aluminum core alloys.

The following examples will further demonstrate the unique brazing capability of the magnesium and lithium-containing filler alloy and the applicability of such filler alloy for the brazing of both Mg-free and Mg-containing alloys using either the CAB method or the vacuum brazing process. Those skilled in the art will appreciate that the alloy of the present invention can also be used in dip brazing, furnace brazing, and brazing by torch heating, induction heating, resistance heating and other suitable means for achieving temperatures required for brazing.

EXAMPLE 1

Experiments were conducted to establish the effectiveness of the novel filler alloy for the production of satisfactory brazed joints between Mg-containing aluminum core alloy parts. The experiments were conducted by brazing test assemblies by both the vacuum brazing and controlled atmosphere brazing methods.

Aluminum brazing sheets, having a thickness of 0.015 inch (0.381 mm), were roll clad on one side with the filler alloys having varying lithium contents and an overall composition shown in Table 1. The cladding layer on the cores was equivalent to about 10% of the total thickness of the clad composite. The composites were partially annealed to the H24 temper in dry nitrogen at about 540° F. (282° C.) for a time period of about 4 hours. The partially annealed core alloy-filler alloy composites were then used to make the test samples which were then brazed together by the vacuum brazing method and also by the controlled atmosphere brazing method under conditions described below.

TABLE 1

Typical Composition of the Li-containing Filler Alloy

| Element | Weight % |
|---|---|
| Li | 0.01–0.30 |
| Si | 9.50 |
| Fe | 0.30 |
| Cu | 0.10 |
| Mn | 1.25(from 1.0) |
| Mg | 0.05–0.61 |
| Zn | 0.08 |
| Others (total) | 0.15 |
| Balance aluminum | |

Two types of samples were examined. First the mini-radiator experimental sample to simulate tube-to-header joints. The other sample was the vertical fin pack sample that was used to determine how well tube-to-fin type joints were made. The mini-radiator sample was coated with a fluoridic flux and controlled atmosphere brazed. The vertical fin pack samples were vacuum brazed; no flux was employed. The filler metal alloys used for these studies were developed to study the effect of Mg, Mn, and Li. Based on the results of our studies, increasing Li levels, up to about 0.05% (by weight) result in progressively larger fillets. Beyond this range, the fillet size becomes smaller. Although the fillet sizes decrease past the optimum Li level, the fillet sizes at 0.3% Li are equal to or larger than the control materials, which contain no Li or Mn. Brazing of the assemblies proceeded as follows:

(a) Vacuum Brazing

The degreased fin pack assemblies were preheated in vacuum to 450° F. (232° C.) for 5 minutes, then they were transferred to the vacuum brazing furnace chamber where they were step-wise heated at first to 1000° F. (538° C.) in 10 minutes, then to 1095°–1120° F. (590°–604° C.) in 6 minutes. The assemblies are then kept within the 1095°–1120° F. (590°–604° C.) range for about 3 minutes, then cooled. The relationship between filler metal Mg and Li levels on the vacuum brazed vertical fin pack fillet sizes are described in Table 2 and graphically in FIGS. 1a and 1b.

TABLE 2

Results from the vertical fin pack test samples described in Example 1

| CFT ID | Control 90-130 | 93-6-16 | 93-6-22 | 91-137-3 | 91-137-6 | 91-137-7 | 91-137-8 | 91-137-9 | 91-137-10 |
|---|---|---|---|---|---|---|---|---|---|
| % Li | 0.000 | 0.100 | 0.250 | 0.013 | 0.030 | 0.010 | 0.000 | 0.025 | 0.014 |
| % Mg | 0.200 | 0.200 | 0.200 | 0.610 | 0.190 | 0.179 | 0.640 | 0.508 | 0.173 |
| % Mn | 0.001 | 0.001 | 0.001 | 0.001 | 1.270 | 1.000 | 0.960 | 0.976 | 0.005 |

TABLE 2-continued

Results from the vertical fin pack test samples described in Example 1

| CFT ID | Control 90-130 | 93-6-16 | 93-6-22 | 91-137-3 | 91-137-6 | 91-137-7 | 91-137-8 | 91-137-9 | 91-137-10 |
|---|---|---|---|---|---|---|---|---|---|
| Joint No. | | | | | | | | | |
| 1 | 0.0761 | 0.0586 | 0.0734 | 0.1252 | 0.0756 | 0.0793 | 0.0779 | 0.0876 | 0.1130 |
| 2 | 0.0745 | 0.0597 | 0.0757 | 0.1110 | 0.0775 | 0.0789 | 0.0775 | 0.0881 | 0.1118 |
| 3 | 0.0767 | 0.0573 | 0.0721 | 0.1285 | 0.0751 | 0.0603 | 0.0753 | 0.0889 | 0.1103 |
| 4 | 0.0768 | 0.0559 | 0.0714 | 0.1282 | 0.0727 | 0.0597 | 0.0740 | 0.0895 | 0.1090 |
| 5 | 0.0750 | 0.0573 | 0.0723 | 0.1192 | 0.0789 | 0.0828 | 0.0850 | 0.0895 | 0.1106 |
| 6 | 0.0765 | 0.0582 | 0.0688 | 0.1169 | 0.0791 | 0.0831 | 0.0814 | 0.0901 | 0.1119 |
| 7 | 0.0768 | 0.0591 | 0.0714 | 0.1194 | 0.0742 | 0.0811 | 0.0819 | 0.0868 | 0.1102 |
| 8 | 0.0775 | 0.0598 | 0.0717 | 0.1177 | 0.0734 | | 0.0811 | 0.0881 | 0.1070 |

Figure 1A:
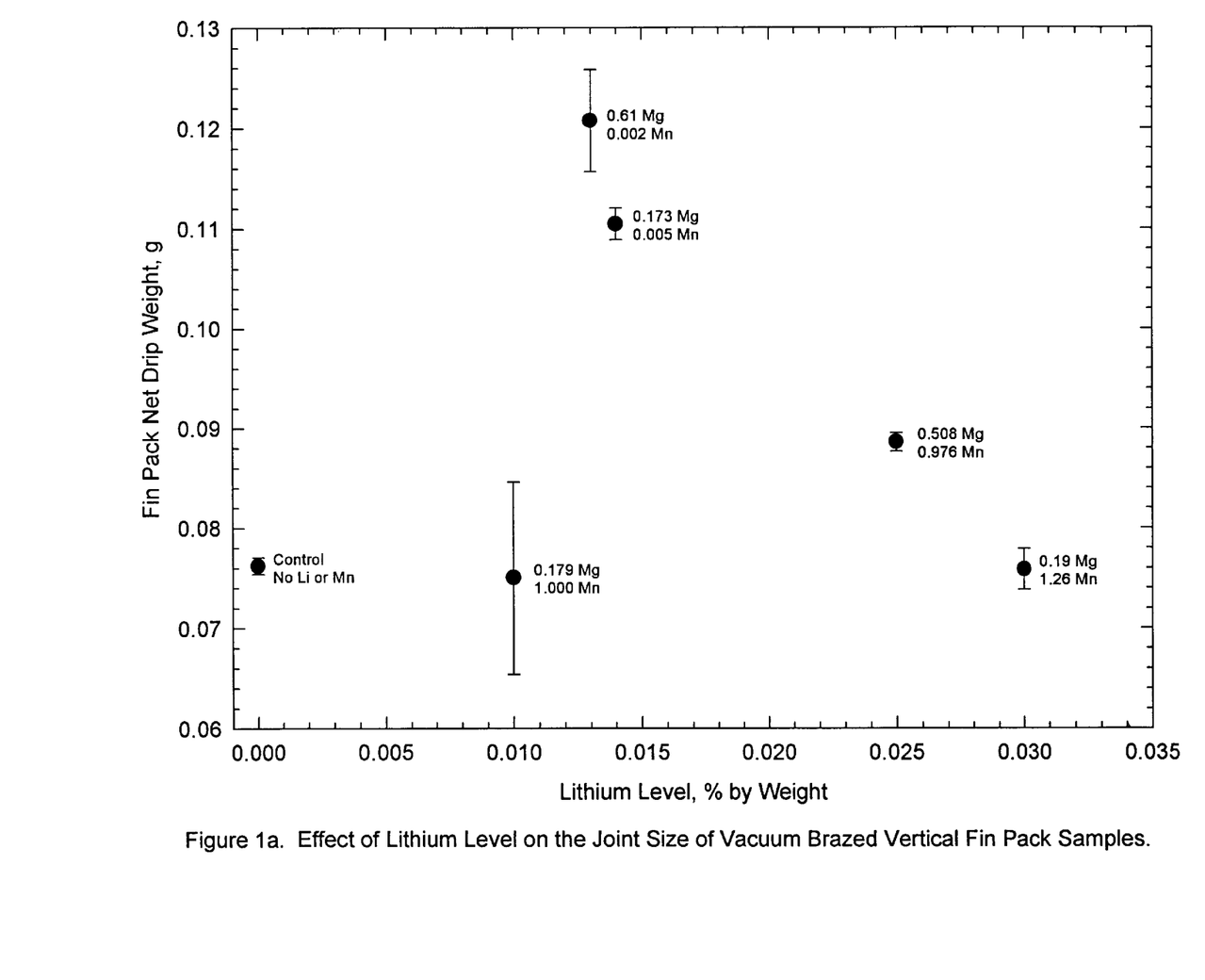
FIG. 1a graphically shows the effect of lithium level on the joint size of vacuum brazed vertical fin pack, according to the present invention.
Figure 1B:
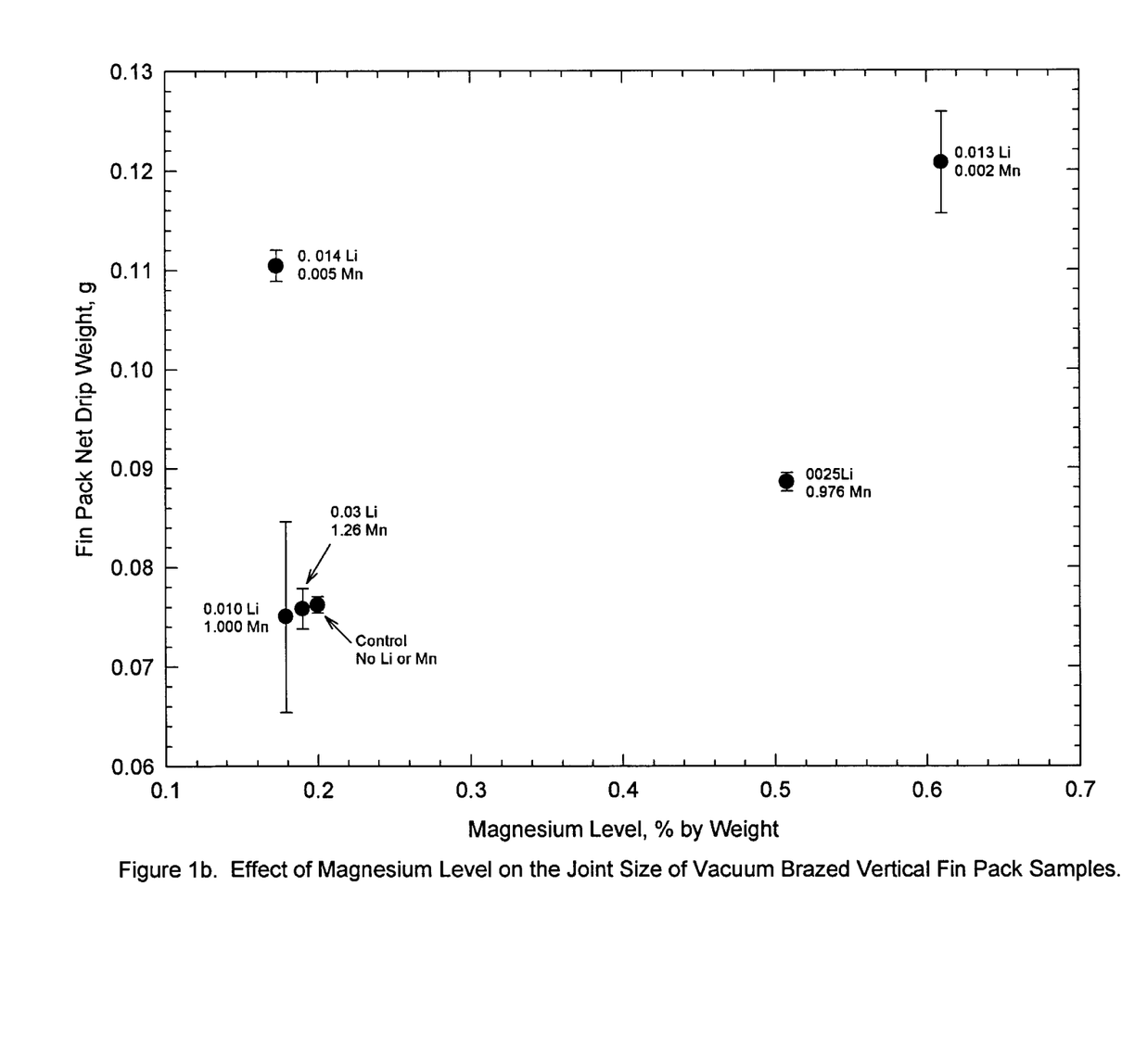
FIG. 1b graphically shows the effect of magnesium level on the joint size of vacuum brazed vertical fin pack, according to the present invention.

Magnesium additions of at least 0.2% are considered requisite for successful vacuum brazing. In this work, we found that Li+Mg results in larger fillets than when Mg or Li is added individually, as shown in FIGS. 1a and 1b. However, manganese (Mn), has effect on the joint size. In FIGS. 1a and 1b, it is clear the when the Mn level reaches about 1.00% to 1.25%, the fillet size is decreased to a level that is only slightly better than the control materials, which contain less than 0.05% Mn. Although Mn decreases the size of the largest fillets developed in the Li+Mg alloys that were vacuum brazed, it does not appear to have the same effect in CAB.

(b) Controlled Atmosphere Brazing

A flux was deposited on the surface of the degreased assemblies in an amount corresponding to about 5 grams/$^2$ surface. The fluxed assemblies were preheated to 450° F. (232° C.) for 15 minutes then transferred to the prebraze chamber where they were soaked at 750° F. (399° C.) for 10 minutes. Subsequently, the preheated assemblies were transferred to the braze chamber (which was purged for 2 hours with dry $N_2$ prior to the brazing) where they were kept at about 1100° F. (593° C.) for 3 minutes and then removed.

Figure 2A:
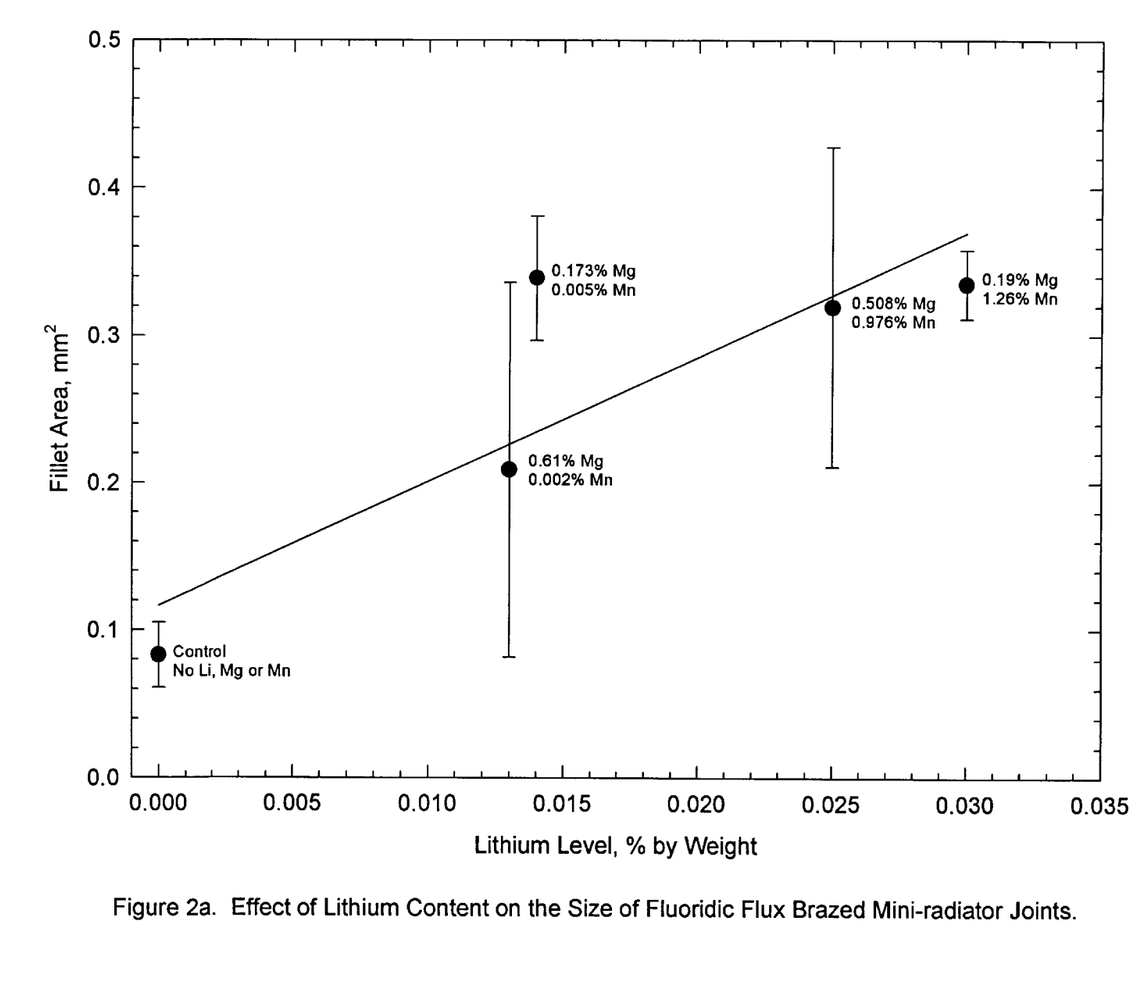
FIG. 2a graphically shows the effect of lithium content on the size of fluoridic flux brazed mini-radiator joints, according to the present invention.
Figure 2B:
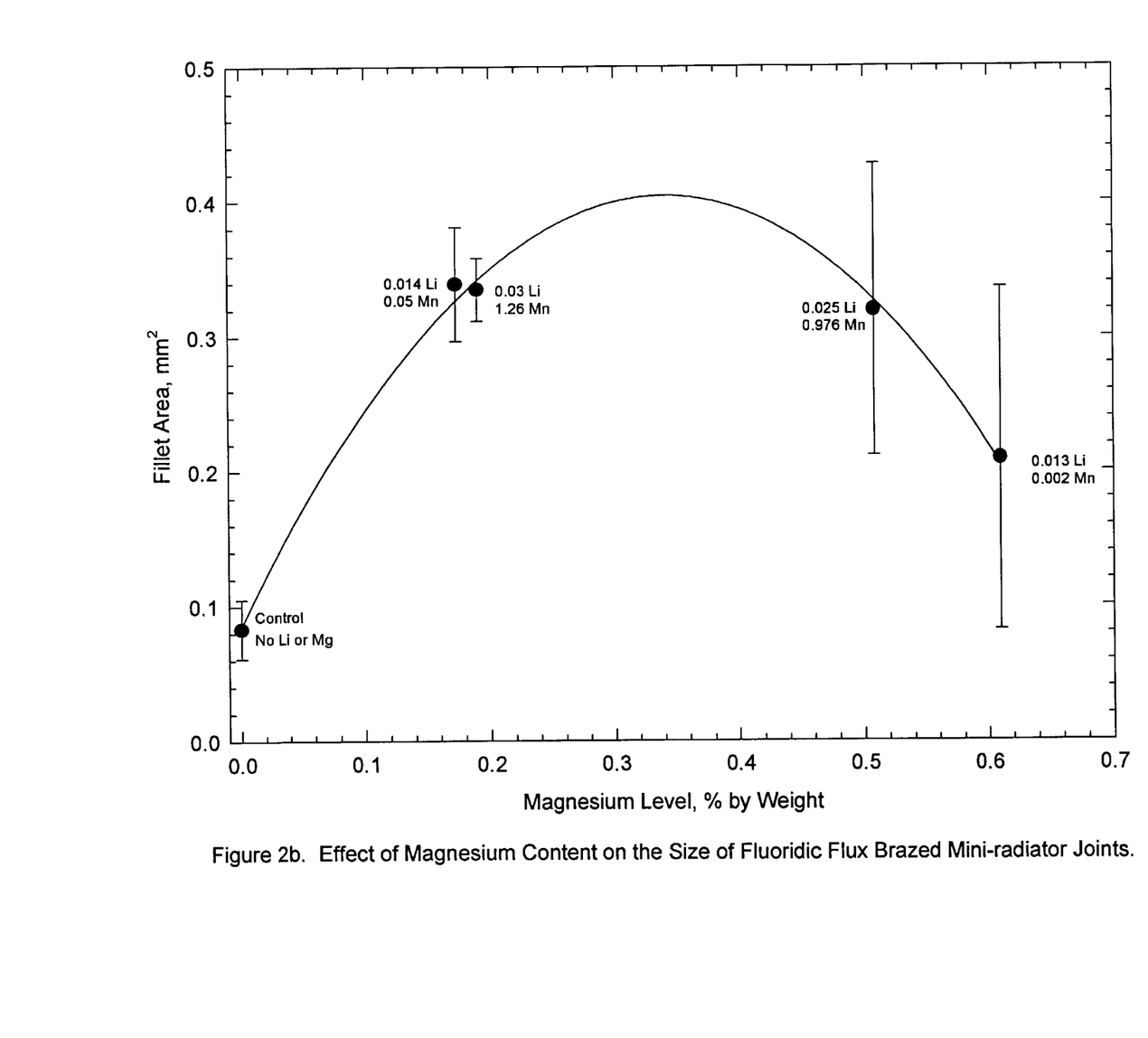
FIG. 2b graphically shows the effect of magnesium content on the size of fluoridic flux brazed mini-radiator joints, according to the present invention.

The effect of the filler metal Mg and Li levels on the mini-radiator tube-to-header joint sizes are described in Table 3 and have been plotted in FIGS. 2a and 2b.

TABLE 3

Effect of filler metal Mg, Li and Mn levels on the fillet sizes of the mini-radiator samples described in Example 1

| CFT ID | 95-200, Control | 91-137-3 | 91-137-6 | 91-137-9 | 91-137-10 |
|---|---|---|---|---|---|
| % Li | 0.0000 | 0.013 | 0.030 | 0.025 | 0.014 |
| % Mg | 0.0000 | 0.610 | 0.190 | 0.508 | 0.173 |
| % Mn | 0.0000 | 0.001 | 1.270 | 0.976 | 0.005 |
| Fillet No. | | | | | |
| 1 | 0.0696 | 0.0000 | 0.3588 | 0.0000 | 0.3149 |
| 2 | 0.0453 | 0.8706 | 0.3069 | 0.4839 | 0.2302 |
| 3 | 0.0154 | 0.0000 | 0.3175 | 0.1802 | 0.4812 |
| 4 | 0.0590 | 0.0000 | 0.3320 | 0.6364 | 0.3920 |
| 5 | 0.0603 | 0.3672 | 0.3748 | 0.0421 | 0.3147 |
| 6 | 0.0549 | 0.0000 | 0.3820 | 0.6412 | 0.4256 |
| 7 | 0.0509 | 0.0491 | 0.3790 | 0.7106 | 0.2757 |
| 8 | 0.0691 | 0.7571 | 0.3127 | 0.2851 | 0.4389 |
| 9 | 0.0388 | 0.3136 | 0.1870 | 0.4100 | 0.3779 |
| 10 | 0.0291 | 0.0396 | 0.3491 | 0.7298 | 0.3132 |
| 11 | 0.0644 | 0.8818 | 0.3788 | 0.0000 | 0.5053 |
| 12 | 0.0824 | 0.0461 | 0.4140 | 0.6810 | 0.3051 |
| 13 | 0.0264 | 0.3657 | 0.2097 | 0.0277 | 0.4259 |
| 14 | 0.0768 | 0.0801 | 0.3271 | 0.0252 | 0.3708 |
| 15 | 0.0352 | 0.0000 | 0.2853 | 0.6519 | 0.3725 |
| 16 | 0.0339 | 0.0000 | 0.2934 | 0.3542 | 0.3571 |

TABLE 3-continued

Effect of filler metal Mg, Li and Mn levels on the fillet sizes of the mini-radiator samples described in Example 1

| CFT ID | 95-200, Control | 91-137-3 | 91-137-6 | 91-137-9 | 91-137-10 |
|---|---|---|---|---|---|
| 17 | 0.1791 | 0.7745 | 0.2972 | 0.0000 | 0.0623 |
| 18 | 0.1642 | 0.0255 | 0.3643 | 0.3713 | 0.1534 |
| 19 | 0.0419 | 0.1092 | 0.3284 | 0.0306 | 0.2572 |
| 20 | 0.0508 | 0.1516 | 0.3892 | 0.3134 | 0.4203 |
| 21 | 0.0460 | 0.0316 | 0.3210 | 0.1196 | 0.2710 |
| 22 | 0.0653 | 0.0839 | 0.3582 | 0.3878 | 0.3815 |
| 23 | 0.0673 | 0.0674 | 0.3772 | 0.2638 | 0.3358 |
| 24 | 0.0648 | 0.0000 | 0.3993 | 0.3212 | 0.3565 |
| 25 | 0.0753 | | | | |
| 26 | 0.0940 | | | | |
| 27 | 0.1837 | | | | |
| 28 | 0.2137 | | | | |
| 29 | 0.0876 | | | | |
| 30 | 0.0462 | | | | |
| 31 | 0.2327 | | | | |
| 32 | 0.2284 | | | | |

Surprisingly, we found that filler metals that also contain Mg, in addition to Li, can be controlled atmosphere brazed. We found that if Li is present in the filler metal, Mg levels up to about 0.4% can be brazed successfully, i.e., uniform fillets that are stitch-free. In FIGS. 2a and 2b, we have shown that the average fillet size for the new Li-Mg filler metals are larger than the control alloys, however, we must also look at the size of the error bars shown around these points (i.e., the 0.508% Mg and 0.61% Mg). Typically, as the span of the error bars increases, the more irregular the fillet size. Some of the joints in these high Mg samples developed very large fillets on one side of the joint, but the other side had no joint. Although the fillet size increased in CAB samples that contained high levels of Mg and a low level of Li, these samples were considered impractical for commercial use. As was noted above, Mn does not appear to affect the brazeability of the Li+Mg alloys, as shown in FIGS. 2a and 2b.

EXAMPLE 2

Figure 3:
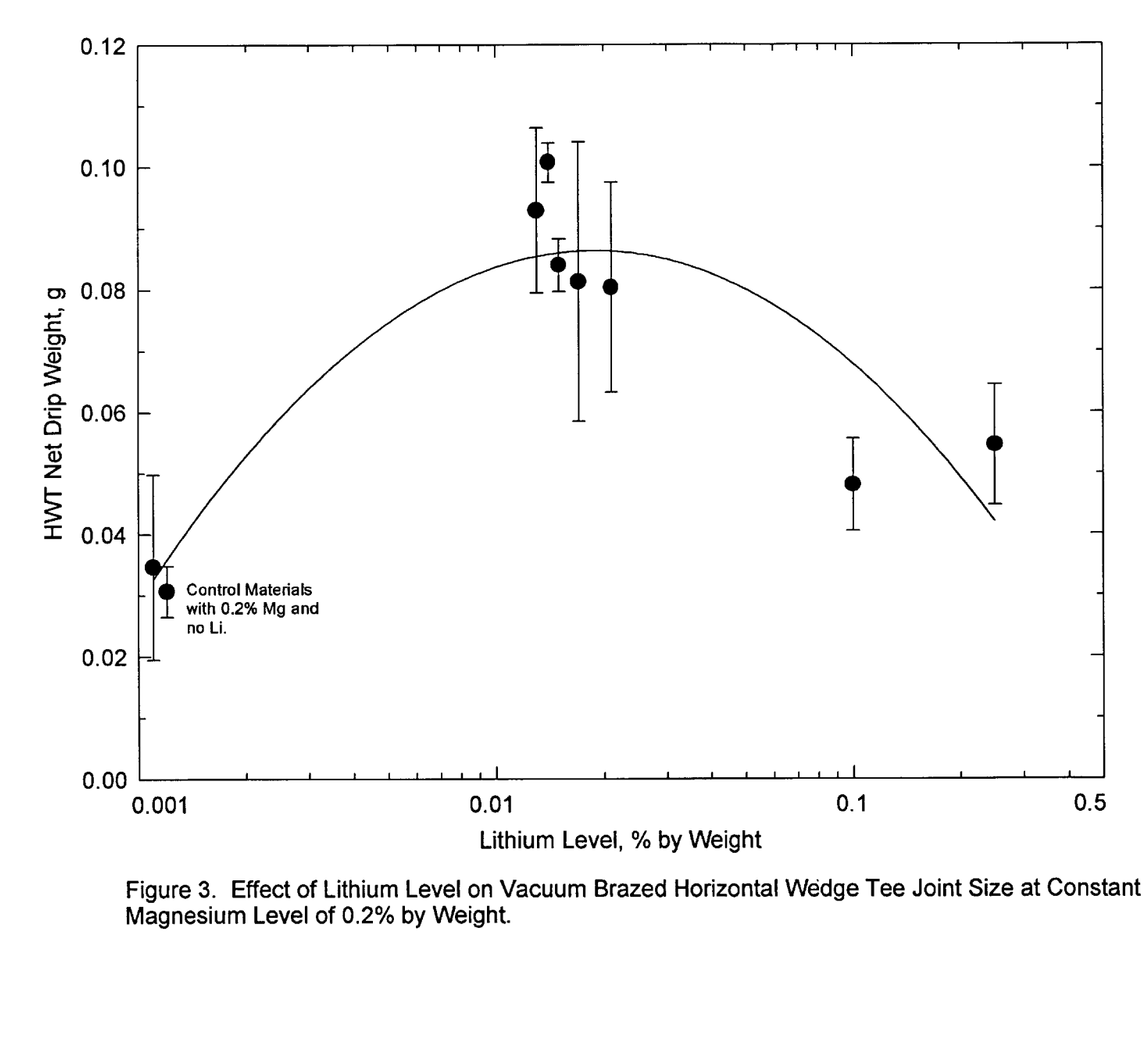
FIG. 3 graphically shows the effect of lithium level on a vacuum brazed horizontal wedge tee joint size at a constant magnesium level of 0.2 wt. %, according to the present invention.

In another example, horizontal wedge tee samples were made with a filler metal containing 0.2% Mg (by weight) and varying levels of Li. These samples were vacuum brazed using the cycle described in Example 1. The results of this test are described in Table 4 and graphically in FIG. 3.

TABLE 4

Vacuum brazed horizontal wedge tee fillet sizes as a function of filler metal Li level as described in Example 2

| CFT ID | Control 90-130 | 93-6-7 | 93-6-16 | 93-6-22 | 90-87-1 | 91-136-12 | 91-136-14 | 91-136-16 | 91-136-18 |
|---|---|---|---|---|---|---|---|---|---|
| % Li | 0.000 | 0.013 | 0.100 | 0.250 | 0.000 | 0.014 | 0.015 | 0.017 | 0.021 |
| % Mg | 0.200 | 0.200 | 0.200 | 0.200 | 0.200 | 0.200 | 0.200 | 0.200 | 0.200 |
| % Mn | 0.001 | 0.001 | 0.001 | 0.001 | 0.001 | 0.001 | 0.001 | 0.001 | 0.001 |
| Joint No. | | | | | | | | | |
| 1 | 0.0232 | 0.1054 | 0.0521 | 0.0499 | 0.0306 | 0.0924 | 0.0828 | 0.0902 | 0.0809 |
| 2 | 0.0306 | 0.0908 | 0.0471 | 0.0590 | 0.0345 | 0.1040 | 0.0863 | 0.0900 | 0.0931 |
| 3 | 0.0402 | 0.0889 | 0.0513 | 0.0609 | 0.0264 | 0.1002 | 0.0805 | 0.0893 | 0.0881 |
| 4 | 0.0444 | 0.0868 | 0.0417 | 0.0487 | 0.0284 | 0.1009 | 0.0848 | 0.0151 | 0.0861 |
| 5 | | | | | 0.0333 | 0.1029 | 0.0941 | 0.0889 | 0.0905 |
| 6 | | | | | | 0.1008 | 0.0798 | 0.0901 | 0.0306 |
| 7 | | | | | | 0.1048 | 0.0777 | 0.1026 | 0.0836 |
| 8 | | | | | | 0.1000 | 0.0863 | 0.0844 | 0.0901 |

EXAMPLE 3

Figure 4:
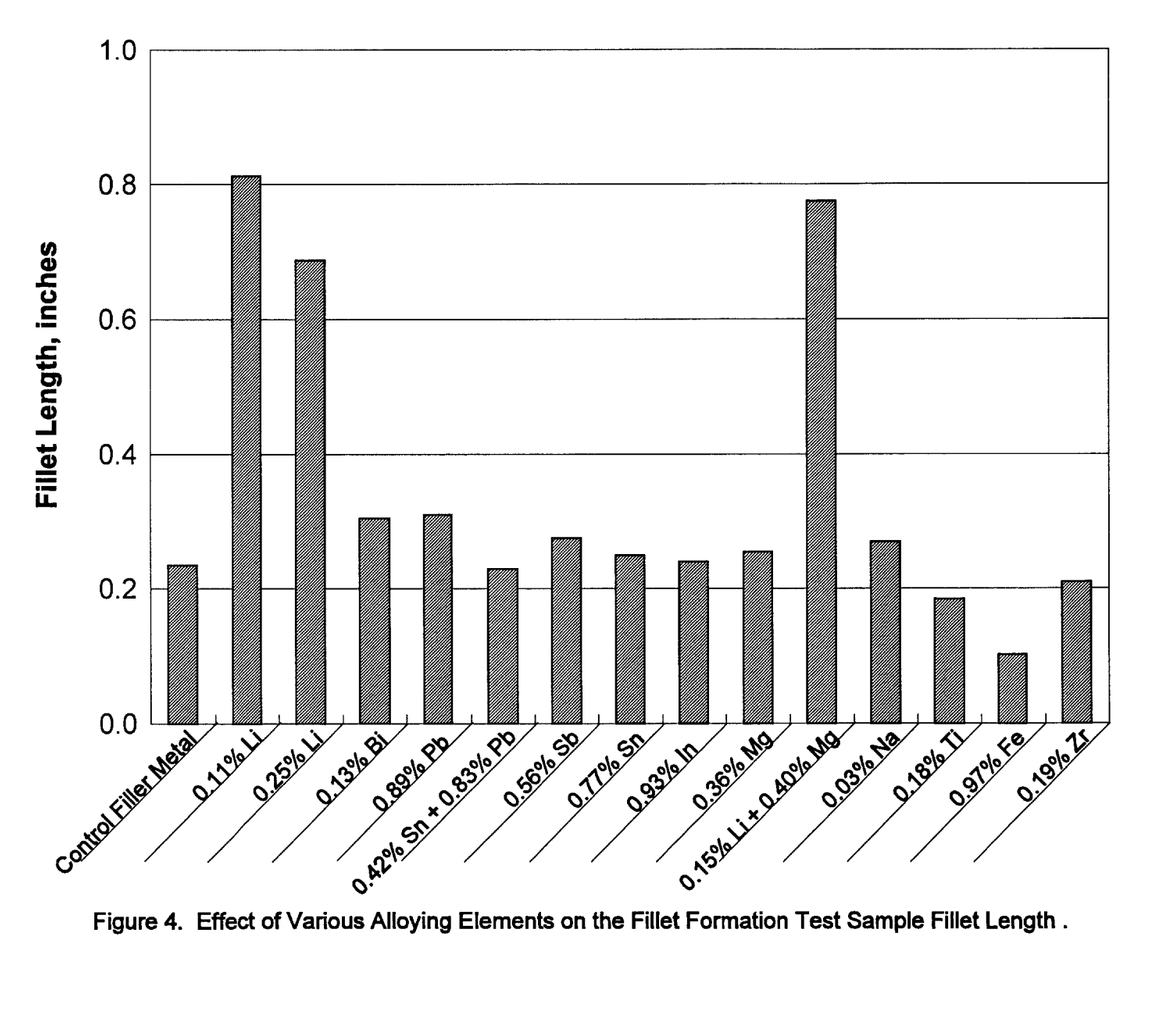
FIG. 4. graphically shows the effect of various alloying elements on fillet formation test sample length, according to the present invention.

Vacuum brazing tests were also conducted to compare the effects of substituting lithium with calcium, sodium and beryllium in the filler alloy. Thus, samples were prepared by replacing the lithium content of the filler alloy composition shown in Table 5 with substantially equivalent quantities of calcium, sodium and beryllium. For comparison, a lithium-containing sample was also used. The Li, Pb, Sn, Na, Mg, In, Sb, Fe, Ti, Zr, and Bi-containing filler alloys were then tested by measuring the fillet lengths formed when subjected to a conventional test based on the comparison of their respective surface tension which is a measure of brazeability. It was found that the fillet lengths and thus the strength properties of the fillets formed from the sodium and beryllium-containing filler alloys were significantly below the strength level of the lithium-containing filler alloy. The results of the comparative tests performed with Li, Pb, Sn, Na, Mg, In, Sb, Fe, Ti, Zr, and Bi-containing filler alloys are graphically depicted in FIG. 4.

TABLE 5

Fillet formation sample test results. All samples were vacuum brazed.

| Filler Alloy + (AA4045 with 0.2% Mg +) (Measured Additions) | Fillet Length inches A-Sample | Fillet Length inches B-Sample | Average Fillet Length inches |
|---|---|---|---|
| Control, No Additions | 0.37 | 0.10 | 0.24 |
| 0.11% Li | 0.83 | 0.80 | 0.81 |
| 0.25% Li | 0.65 | 0.73 | 0.69 |
| 0.13% Bi | 0.29 | 0.32 | 0.31 |
| 0.89% Pb | 0.35 | 0.27 | 0.31 |
| 0.42% Sn + 0.83% Pb | 0.21 | 0.25 | 0.23 |
| 0.56% Sb | 0.30 | 0.25 | 0.28 |
| 0.77% Sn | 0.25 | 0.25 | 0.25 |
| 0.93% In | 0.20 | 0.28 | 0.24 |
| 0.36% Mg | 0.22 | 0.29 | 0.26 |
| 0.15% Li + 0.40% Mg | 0.90 | 0.65 | 0.78 |
| 0.03% Na | 0.27 | 0.27 | 0.27 |
| 0.18% Ti | 0.17 | 0.20 | 0.19 |
| 0.97% Fe | 0.13 | 0.08 | 0.10 |
| 0.19% Zr | 0.22 | 0.20 | 0.21 |

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

We claim:

1. A method for joining aluminum parts by brazing to produce an assembly, the method comprising:

(a) providing a composite sheet having an aluminum core alloy material and a filler alloy cladding, applied to the core alloy material, the cladding comprising about 4 to 18 wt. % silicon; about 0.001 to 0.4 wt. % magnesium; about 0.01 to 0.3 wt. % lithium; not more than about 2 wt. % zinc; not more than about 1.25 wt. % manganese; not more than about 0.30 wt. % iron; not more than about 0.10 wt. % copper; not more than 0.15 wt. % impurities; balance aluminum;

(b) contacting an aluminum part with the filler alloy cladding; and (c) brazing the aluminum part and the composite sheet using flux to produce a brazed assembly under controlled atmosphere brazing conditions.

2. The method of claim 1 wherein the brazing occurs in a reduced atmosphere environment.

3. The method of claim 1 wherein the brazing occurs at a pressure greater than atmospheric.

4. The method of claim 1 further comprises applying a flux to the aluminum part prior step (c).

5. The method of claim 4 is selected from the group consisting of chlorides, fluorides, and mixtures thereof.

6. The method of claim 1 wherein step (c) is selected from the group consisting of dip brazing, furnace brazing, brazing by torch heating, brazing by induction heating, and brazing by resistance heating.

7. The method of claim 1 wherein the assembly is a heat exchanger.

8. The method of claim 1 wherein the assembly is an evaporator.

9. The method of claim 1 wherein the filler alloy comprises a magnesium content ranging from about 0.2 to 0.4 wt. %.

10. The method of claim 1 wherein the filler alloy comprises a lithium content ranging from about 0.01 to 0.03 wt. %.

11. The method of claim 1 wherein the brazing composite core material is selected from the group consisting of the Aluminum Association 1XXX, 3XXX, 5XXX, and 6XXX series aluminum alloys.

12. The method in accordance with claim 1, wherein the magnesium content is between about 0.001 and 0.38 wt. %.

13. A method for joining aluminum parts by brazing to produce an assembly, the method comprising:

(a) providing a composite sheet having an aluminum core alloy material and a filler alloy cladding, applied to the core alloy material, the cladding comprising about 4 to 18 wt. % silicon; about 0.173 to 0.40 wt. % magnesium;

about 0.01 to 0.3 wt. % lithium; not more than about 2 wt.% zinc; not more than about 1.25 wt. % manganese; not more than about 0.30 wt. % iron; not more than about 0.10 wt. % copper; not more than 0.15 wt. % impurities; balance aluminum;

(b) contacting an aluminum part with the filler alloy cladding; and (c) brazing the aluminum part and the composite sheet using flux to produce a brazed assembly under controlled atmosphere brazing conditions.

14. A method in accordance with claim 12, wherein the magnesium content is between about 0.190 and 0.40 wt %.

15. A method in accordance with claim 12, wherein the magnesium content is between about 0.2 and 0.4 wt %.

16. The method in accordance with claim 12, wherein the magnesium content is between about 0.173 and 0.38 wt. %.

17. A method for joining aluminum parts by brazing to produce an assembly, the method comprising:

(a) providing a composite sheet having an vacuum core alloy material and a filler alloy cladding applied to the core alloy material the cladding comprising about 4 to 18 wt. % silicon; at least 0.05 wt. %, but less than 0.4 wt. %, magnesium; about 0.01 to 0.3 wt. % lithium; not more than about 2 wt. % zinc; not more than about 1.25 wt. % manganese; not more than about 0.30 wt. % iron; not more than about 0.10 wt. % copper; not more than 0.15 wt. % impurities; the balance aluminum;

(b) contacting aluminum part with the filler alloy cladding; and (c) brazing the aluminum part and the composite sheet using either vacuum brazing or controlled atmosphere brazing to produce a brazed assembly.

18. The method in accordance with claim 17, wherein the magnesium content is between about 0.173 and 0.38 wt. %.

19. The method in accordance with claim 17, wherein the magnesium content is between about 0.173 and 0.20 wt. %.

* * * * *

UNITED STATES PATENT AND TRADEMARK OFFICE
CERTIFICATE OF CORRECTION

PATENT NO.   : 5,971,258
DATED        : October 26, 1999
INVENTOR(S)  : Eichhorn et al.

It is certified that error appears in the above-indentified patent and that said Letters Patent is hereby corrected as shown below:

Claim 17, column 11, line 19 "vacuum core" should be --aluminum core--.

Signed and Sealed this

Thirteenth Day of June, 2000

Attest:

Q. TODD DICKINSON

*Attesting Officer*           *Director of Patents and Trademarks*